May 21, 1963  J. D. CRONE  3,090,911
METHOD OF ELECTROMAGNETIC PROSPECTING BY TRANSMITTING FROM
TWO SPACED POINTS ELECTROMAGNETIC FIELDS
OF THE SAME SHAPE

Filed May 18, 1961  3 Sheets-Sheet 1

INVENTOR
JAMES DUNCAN CRONE

BY: *Featherstonhaugh & Co*
ATTORNEYS

May 21, 1963

J. D. CRONE 3,090,911

METHOD OF ELECTROMAGNETIC PROSPECTING BY TRANSMITTING FROM
TWO SPACED POINTS ELECTROMAGNETIC FIELDS
OF THE SAME SHAPE

Filed May 18, 1961

INVENTOR
JAMES DUNCAN CRONE

BY: Fetherstonhaugh & Co
ATTORNEYS

May 21, 1963    J. D. CRONE    3,090,911
METHOD OF ELECTROMAGNETIC PROSPECTING BY TRANSMITTING FROM
TWO SPACED POINTS ELECTROMAGNETIC FIELDS
OF THE SAME SHAPE
Filed May 18, 1961    3 Sheets-Sheet 3

INVENTOR
JAMES DUNCAN CRONE

BY: Fetherstonhaugh & Co
ATTORNEYS

ця
3,090,911
METHOD OF ELECTROMAGNETIC PROSPECTING BY TRANSMITTING FROM TWO SPACED POINTS ELECTROMAGNETIC FIELDS OF THE SAME SHAPE
James Duncan Crone, 187 Murdoch Ave., Noranda, Quebec, Canada
Filed May 18, 1961, Ser. No. 110,974
9 Claims. (Cl. 324—6)

This invention relates to an electromagnetic method of geophysical prospecting.

It is well known that one can detect subterranean conductor anomalies by transmitting electromagnetic signals into the ground in such a manner that they couple with a sought conductor and detecting the resultant electromagnetic field at a point spaced from the transmitting station.

Many procedures of transmitting a signal and measuring the resultant field are known.

This invention relates to a procedure that is very rapid, requires relatively light apparatus and can effectively be used in country where there is substantial difference in elevation between the transmitting and receiving stations.

Generally speaking, the method comprises the transmission of an electromagnetic field from point A measuring the dip angle resulting from the field at a point B spaced therefrom, transmitting an electromagnetic field similar to the one that was transmitted from A, from the point B and measuring the dip angle resulting from the field transmitted from point B at point A. A comparison of the dip angles measured in accordance with the above procedure at points A and B will give an indication of a conductor anomaly.

The invention will be clearly understood after reference to the following detailed specification read in conjunction with the drawings.

Figure 1:
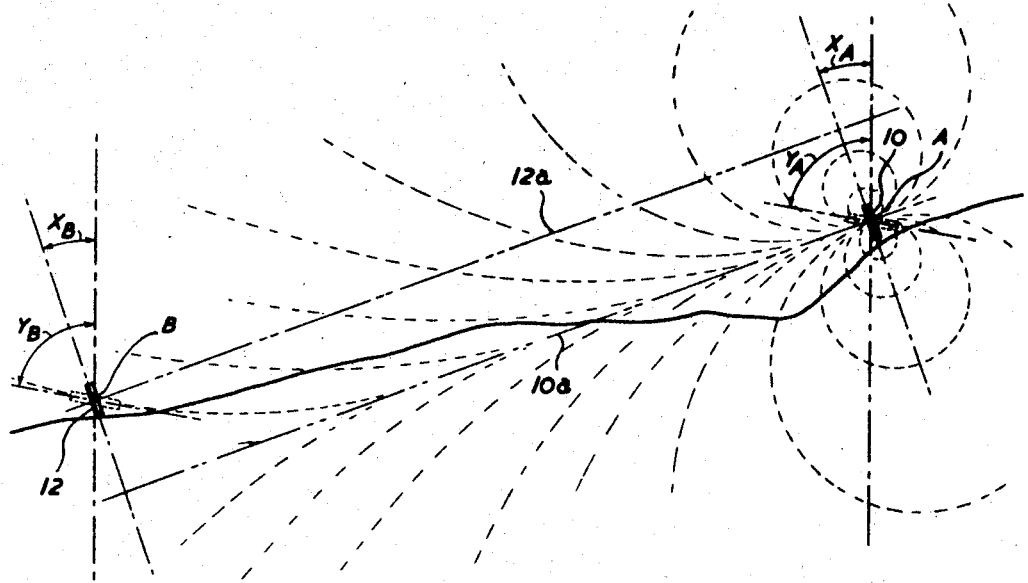
FIGURE 1 is a schematic illustration showing stations from which coils according to the present invention are operated as transmitters and receivers.

As indicated above, in practising the method of this invention, two stations A and B are chosen and two coils of similar geometry and electrical characteristics 10 and 12 are employed. Associated with each coil is a battery-operated oscillator adapted to create an alternating current therein to cause the coil to transmit electromagnetic signals and thereby create an electromagnetic field. The apparatus for supplying alternating current to transmitting coils in geophysical instruments is very well-known to those skilled in the art and it is not necessary in this specification to give detail of it.

The frequency of the electromagnetic field and the power required to get good penetration are both considerations that are well-known to those skilled in the art and further reference will not be made to them here.

As well as being able to transmit a signal and create an electromagnetic field, each of the coils 10 and 12 is capable of acting as an antenna, within the spacing of the stations A and B, to detect a field transmitted by the other coil and has an amplifier and signal detecting device associated therewith according to known practice.

Each of the coils is substantially the same shape so that the electromagnetic fields transmitted thereby are substantially identical in shape and the power producing units associated with each of the coils are of substantially the same power so that the resulting fields from each of the coils are of about the same strength.

In practice, a signal is applied to coil 10 at station A. Coil 10 is held at an arbitrary inclination of say angle $X_A$ to the vertical and a current passed therethrough to create an electromagnetic field generally indicated by the numeral 21; station B is chosen adjacent the vertical plane passing through the principal axis of coil 10. Coil 12, tuned as a receiver to the frequency of the field transmitted from A, is turned at station B to determine the direction of the electromagnetic field resulting from the transmission from coil 10 at station A. It is preferable to rotate coil 12 until a null is detected on the audible signal device of its associated amplifier according to standard geophysical practice. A null is detected with the coil 12 in the dotted line position (i.e., when plane of coil is aligned with the direction of the magnetic field) and dip angle $Y_B$ is measured.

At station B coil 12 is then oriented to assume an angle $X_B$ to the vertical to equal $X_A$ with its principal axis in a vertical plane that is adjacent coil 10 at station A. It will be noted that the principal axis of the coil 12 when it is in the transmitting position, is parallel to the principal axis 10a of the coil 10 when it was previously in the transmitting position, so that the principal axes of the transmitted fields are substantially parallel. By the term "parallel" in this application, it is intended that the extreme case of when the distance between the two axes is zero (that is, they are coincident) be included. A signal is then transmitted from coil 12 by its associated transmitter having the same frequency and strength as the signal transmitted from coil 10 at station A to create an electromagnetic field. Coil 10 is operated as a detector with its associated amplifier and audible signal detector to measure the direction of this field at the point A. The principal axis of the coil is also the principal axis of the magnetic field created thereby.

The dip angle as determined by the direction of the fields at points A and B are then compared. If the angles $Y_A$ and $Y_B$ are the same at points A and B, it is an indication that there is no subterranean anomaly. If, however, there is a difference between the angles $Y_A$ and $Y_B$ at the stations A and B, this is an indication that there is a subterranean anomaly.

The receiving coil in each instance is adjacent the vertical plane passing through the principal axis of the transmitting coil. In practice, employing a transmitting frequency of between 480 and 1800 cycles per second and a transmitting power of six watts, the stations A and B are about 200 feet apart. Under these conditions, the receiving coil is with little difficulty located in the vertical plane passing through the principal axis of the transmitting coil or very close to it. However, it has been found that to locate the receiving coil in a vertical plane, that intersects the vertical plane passing through the principal axis of the transmitting coil adjacent the point of transmission, does not materially affect the accuracy of the method.

Figure 2:
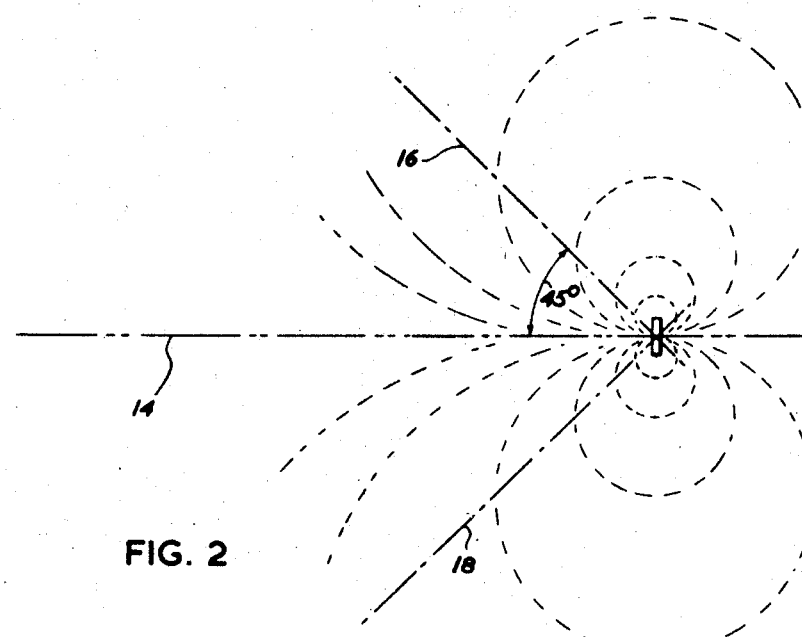
FIGURE 2 is a plan view of one of the coils of FIGURE 1.

In FIGURE 2, which is a partial plan view of FIGURE 1 showing the coil at station A, the numeral 14 refers to a vertical plane passing through the principal axis of the coils 10 and 12, the numeral 16 refers to a vertical plane passing through the station A and 45° from the plane 14 and the numeral 18 refers to a vertical plane 45° from the plane 14 and passing through the station A. When transmitting from the station A, a reliable result can be obtained at least anywhere between the contained planes 16 and 18.

Figure 3:
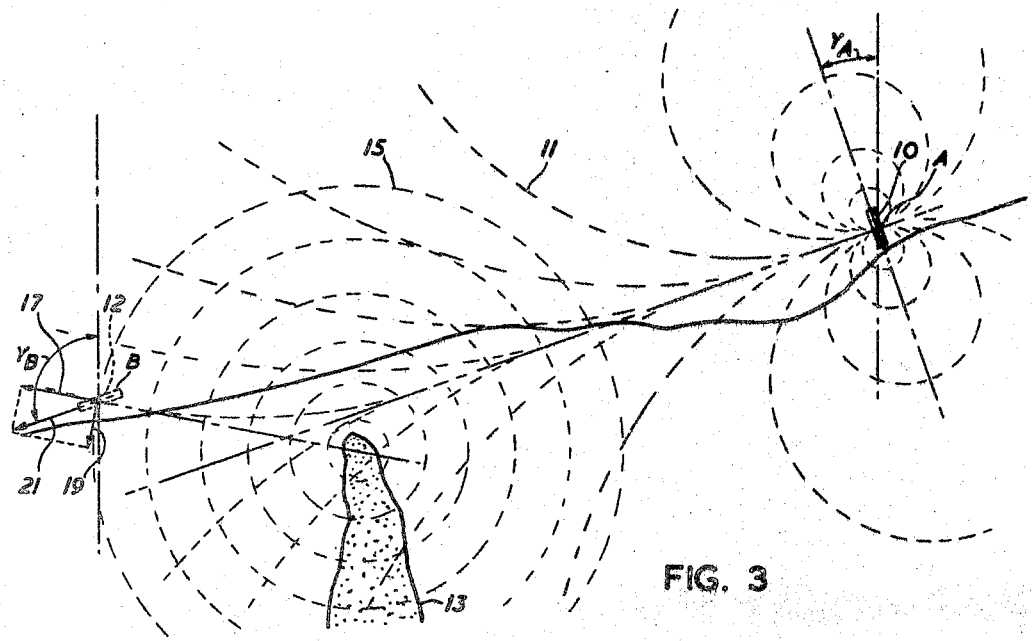
FIGURE 3 is a view similar to FIGURE 1 showing the effect of an ore body.

In FIGURE 3, the effect of a subterranean anomaly on dip angle is illustrated. In this case, the transmitting coil 10 at station A creates a magnetic field generally indicated by the numeral 11. Currents are induced in the ore body 13 which create an electromagnetic field generally indicated by the numeral 15. At the station B the magnetic field 11 is represented by the vector 17 and magnetic field 15 is represented by the vector 19. The resultant magnetic field is represented by the vector 21. A null will be detected by the coil 12 at station B when the coil is aligned with the direction of the resultant vector 21. In this case, the angle $Y_B$ has been increased in size due to the effect of the conductor anomaly 13.

Transmission back from station B to A is the same as previously described. It will be apparent, however, that the angle $Y_A$ will not be the same in magnitude as $Y_B$ because the effect of the conductor anomaly 13 on the dip at station A will not be the same as the effect of the conductor anomaly 13 on the dip at station B.

Figure 4:
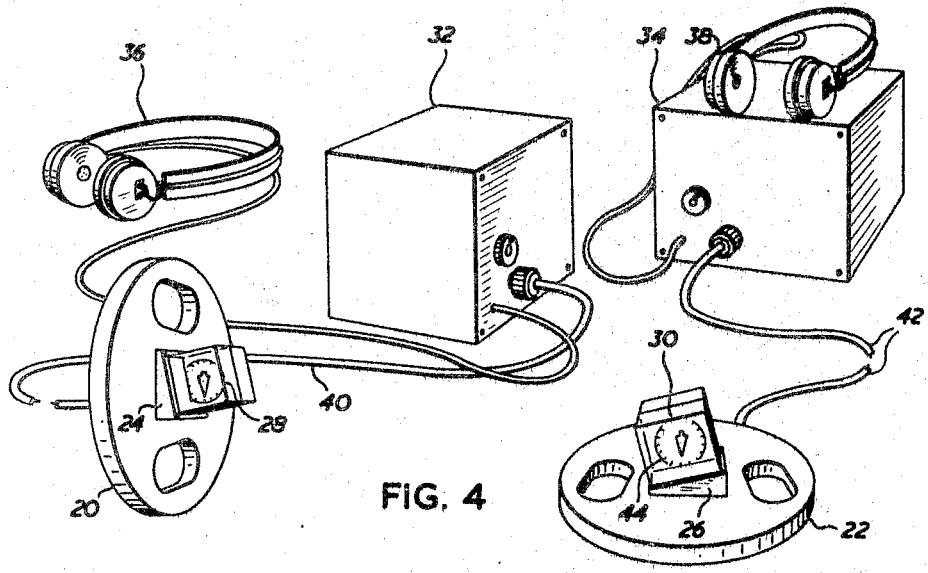
FIGURE 4 shows a coil and its related equipment.

In FIGURE 4, there is illustrated appropriate apparatus for practising the invention. In these figures, I am assigning different numbers to the numbers assigned to the coils in the schematic illustration of FIGURES 1, 2 and 3. The apparatus comprises two coils 20 and 22 each having a block 24 and 26 respectively and a gravity seeking indicator 28 and 30 respectively mounted thereon. The numerals 32 and 34 refer to boxes for the signal-producing oscillator and amplifier for amplifying detected signals. Numerals 36 and 38 refer to headphones used by an operator of the equipment to detect the output of the amplifier when the units are used as receiver. Cables 40 and 42 contain the necessary connections between the coils 20 and 22 respectively to their respective oscillators and amplifiers. Appropriate controls are provided for causing the coils to act as transmitters or receivers when required. The electrical design of the coils and transmitters and amplifiers is not thought to be relevant and is not referred to in greater detail in this specification.

The wedges 24 and 26 are cut so that the surface thereof that supports the gravity indicating devices 28 and 30 respectively is on a surface that makes an angle equal to the angles $X_A$ and $X_B$ as illustrated in FIGURE 1. I have found that an angle $X_A$ and $X_B$ equal to 15° gives a satisfactory and workable device.

Thus, by holding the coil 20 so that the gravity seeking indicator 28 aligns with the gravitational field of the earth, the plane of coil 20 is automatically at the angle X to the vertical. Transmission is effected when the gravity seeking arm of the indicator 28 is in this position.

When the unit is used as a receiver, a scale indicated by the numeral 44 is provided for the gravity indicating devices that will read the angle Y directly. The receiving coil will be in a generally horizontal position as indicated in FIGURE 4 when no anomaly is present.

Figure 5:
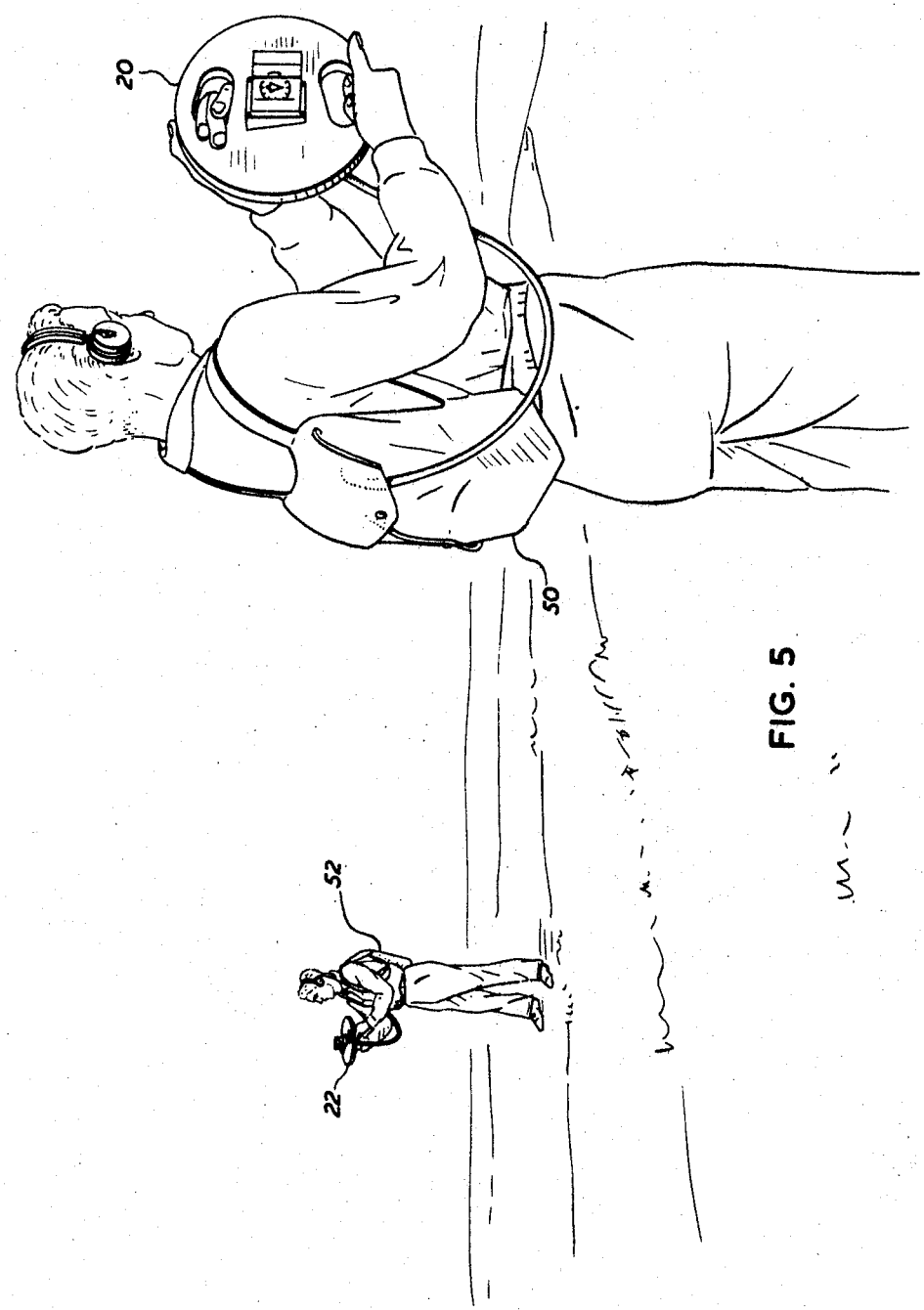
FIGURE 5 is a view showing apparatus being used.

FIGURE 5 shows the apparatus in actual use. In this figure, coil 20 is being used as a transmitter and coil 22 is being used as a receiver. The oscillator and amplifier are contained in the knapsacks 50 and 52 worn by the two users. It will be appreciated that after the reading is taken, the coil 22 will be operated as a transmitter and the coil 20 will be operated as a receiver in accordance with the detailed operational instructions given above.

Embodiments of this invention other than the one illustrated will be apparent to those skilled in the art and it is not my intention that the foregoing specification be read in a limiting sense.

What I claim as my invention is:

1. A method of geophysical prospecting comprising the steps of propagating a first primary electromagnetic field from station A, measuring the inclination of the electromagnetic field that is the resultant of said first primary electromagnetic field and any other electromagnetic field induced thereby at station B, station B being spaced from station A, propagating a second primary electromagnetic field from adjacent station B, said second primary electromagnetic field having its principal axis substantially parallel to the principal axis of said first primary electromagnetic field previously propagated from station A, said first primary electromagnetic field and said second primary electromagnetic field having the same shape, measuring the inclination of the electromagnetic field that is the resultant of said second electromagnetic field and any other electromagnetic field induced thereby adjacent station A, and comparing the inclinations measured at stations A and B as an indication of a conductor anomaly.

2. A method of geophysical prospecting as claimed in claim 1 in which station B is adjacent the vertical plane through the principal axis of said first primary electromagnetic field.

3. A method of geophysical prospecting as claimed in claim 2 in which said first primary electromagnetic field and said second primary electromagnetic field are substantially the same strength.

4. A method of geophysical prospecting as claimed in claim 1 in which said first primary electromagnetic field and said second primary electromagnetic field are substantially the same strength.

5. A method of geophysical prospecting as claimed in claim 1 in which said second primary electromagnetic field is propagated from adjacent station B as aforesaid and the propagation point is always contained by a first vertical plane through the principal axis of the primary magnetic field emanating from station A and a second vertical plane through station A at an angle of 45° to said first vertical plane.

6. A method of geophysical prospecting comprising the steps of propagating a first primary electromagnetic field from station A, measuring the inclination of the electromagnetic field that is the resultant of said first primary electromagnetic field and any other electromagnetic field induced thereby at station B, station B being spaced from station A, propagating a second primary electromagnetic field at station B, said second primary electromagnetic field having its principal axis substantially parallel to the principal axis of said first primary electromagnetic field previously propagated from station A, said first primary electromagnetic field and said second primary electromagnetic field having the same shape, measuring the inclination of the electromagnetic field that is the resultant of said second electromagnetic field and any other electromagnetic field induced thereby at station A, and comparing the inclinations measured at stations A and B as an indication of a conductor anomaly.

7. A method of geophysical prospecting as claimed in claim 6 in which station B is adjacent the vertical plane through the principal axis of said first primary electromagnetic field.

8. A method of geophysical prospecting as claimed in claim 7 in which said first primary electromagnetic field and said second primary electromagnetic field are substantially the same strength.

9. A method of geophysical prospecting as claimed in claim 6 in which said first primary electromagnetic field and said second primary electromagnetic field are substantially the same strength.

References Cited in the file of this patent

UNITED STATES PATENTS

| | | |
|---|---|---|
| 1,678,489 | Sundberg | July 24, 1928 |
| 1,718,352 | Guilford | June 25, 1929 |
| 2,139,460 | Potapenko | Dec. 6, 1938 |